US009487305B2

(12) United States Patent
Yang et al.

(10) Patent No.: US 9,487,305 B2
(45) Date of Patent: *Nov. 8, 2016

(54) COMMUNICATIONS QUALITY ANALYSIS

(71) Applicant: The Boeing Company, Chicago, IL (US)

(72) Inventors: Yifan Yang, Seattle, WA (US); Elwyn William Hubbard, Manassas, VA (US); Christopher J. Devine, Bristow, VA (US); James M. Rush, Derby, KS (US); Gregory W. Smith, Wichita, KS (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,877

(22) Filed: Dec. 7, 2015

(65) Prior Publication Data
US 2016/0083108 A1 Mar. 24, 2016

Related U.S. Application Data

(63) Continuation of application No. 13/161,875, filed on Jun. 16, 2011, now Pat. No. 9,220,018.

(51) Int. Cl.
G01R 31/08 (2006.01)
B64D 45/00 (2006.01)
H04W 24/00 (2009.01)
H04W 24/08 (2009.01)
H04L 12/801 (2013.01)

(52) U.S. Cl.
CPC ............. B64D 45/00 (2013.01); H04W 24/00 (2013.01); H04W 24/08 (2013.01); H04L 47/10 (2013.01)

(58) Field of Classification Search
None
See application file for complete search history.

(56) References Cited

U.S. PATENT DOCUMENTS

| 5,949,760 | A | 9/1999 | Stevens et al. |
| 5,987,011 | A | 11/1999 | Toh |
| 6,502,131 | B1 | 12/2002 | Vaid et al. |
| 6,816,903 | B1 | 11/2004 | Rakoshitz et al. |
| 8,027,273 | B2 * | 9/2011 | Nguyen ............... H04L 41/12 370/238 |
| 8,260,322 | B2 | 9/2012 | Allen et al. |
| 8,369,217 | B2 | 2/2013 | Bostica et al. |
| 2004/0142658 | A1 | 7/2004 | McKenna et al. |
| 2004/0142699 | A1 * | 7/2004 | Jollota ............... H04W 16/14 455/452.2 |

(Continued)

OTHER PUBLICATIONS

Garcia, "Visualization of Stimulated DODAF Architectures", pp. 1-8, Jul. 2008 http://www.simisinc.com/whitepapers/Visualization_of_Dynamic_Architectures_071108.pdf.

(Continued)

Primary Examiner — Gregory Sefcheck
Assistant Examiner — Jael Ulysse
(74) Attorney, Agent, or Firm — Yee & Associates, P.C.

(57) ABSTRACT

A system and method for analyzing a scenario, such as a communications scenario in which the end-to-end quality of communications between end nodes of a communications link may be affected by various factors and conditions. Such factors and conditions may include performance parameters of the end nodes and intermediate nodes, human operational performance, and external conditions, such as weather. Qualitative and quantitative representations of the end-to-end quality of communications are presented simultaneously and in a time-synchronized manner with displays of the relevant performance parameters, indications of human operational actions, and locations of nodes of the communications link and external conditions.

20 Claims, 9 Drawing Sheets

(56) References Cited

U.S. PATENT DOCUMENTS

| | | |
|---|---|---|
| 2005/0108374 A1 | 5/2005 | Pierzga et al. |
| 2005/0208952 A1 | 9/2005 | Dietrich et al. |
| 2006/0217115 A1 | 9/2006 | Cassett et al. |
| 2007/0041330 A1* | 2/2007 | Bostica .............. H04W 24/00 370/252 |
| 2007/0087756 A1* | 4/2007 | Hoffberg ............ G06Q 10/0631 455/450 |
| 2007/0280113 A1 | 12/2007 | Ninan et al. |
| 2009/0265635 A1 | 10/2009 | Citrano |
| 2009/0279490 A1 | 11/2009 | Alcorn |
| 2009/0300095 A1 | 12/2009 | Bouchard et al. |
| 2010/0085417 A1 | 4/2010 | Satyanarayanan et al. |
| 2010/0135186 A1 | 6/2010 | Choong et al. |
| 2010/0172265 A1 | 7/2010 | Wheeler et al. |
| 2010/0269143 A1 | 10/2010 | Rabowsky |
| 2010/0274908 A1* | 10/2010 | Koskelainen .......... H04L 45/00 709/227 |
| 2012/0030717 A1 | 2/2012 | Buga et al. |

OTHER PUBLICATIONS

ITU-T Telecommunication Standardization Sector of ITU, G.107—Series G: Transmission Systems and Media, Digital Systems and Networks, International telephone connections and circuits—Transmission planning and the E-model—The E-model: a computational Model for use in transmission planning—Apr. 2009, pp. 1-27.

Office Action, dated Jul. 18, 2013, regarding U.S. Appl. No. 13/161,875, 36 pages.

Final Office Action, dated Jan. 6, 2014, regarding U.S. Appl. No. 13/161,875, 36 pages.

Office Action, dated Dec. 12, 2014, regarding U.S. Appl. No. 13/161,875, 40 pages.

Final Office Action, dated Mar. 25, 2015, regarding U.S. Appl. No. 13/161,875, 44 pages.

Notice of Allowance, dated Aug. 14, 2015, regarding U.S. Appl. No. 13/161,875, 18 pages.

* cited by examiner

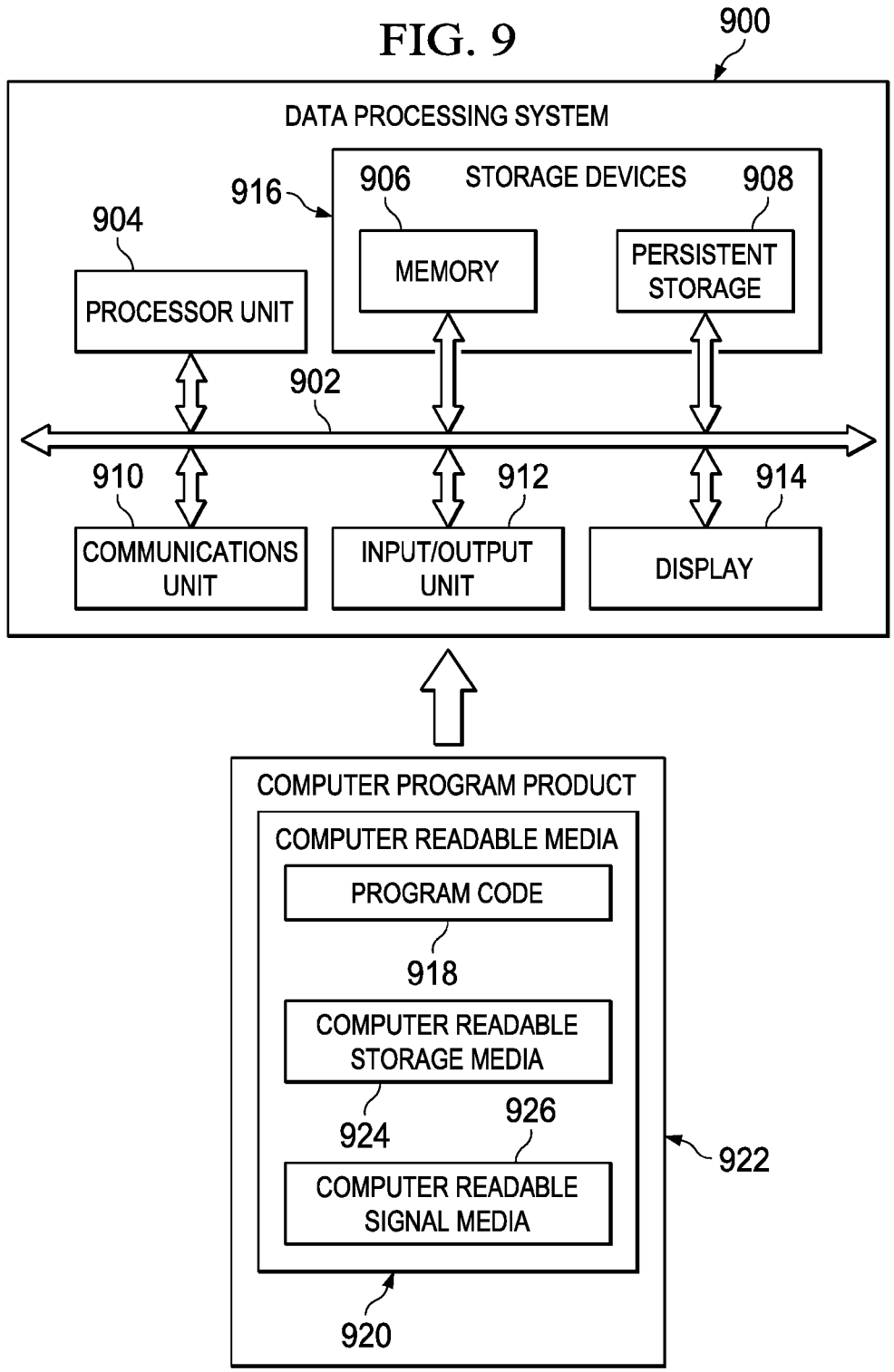

COMMUNICATIONS QUALITY ANALYSIS

This application is a continuation application of U.S. patent application Ser. No. 13/161,875, filed Jun. 16, 2011.

BACKGROUND INFORMATION

1. Field

The present disclosure relates generally to communications links and more particularly to systems and methods for depicting, analyzing, and managing the quality of communications links.

2. Background

A communications link provides for communications between two or more end point nodes. Communications links may support various types of communications between the end point nodes. For example, a communications link may support audio, video, audio and video, digital data and/or other types of communications between the end point nodes. Some communications links may support multiple types of communications between the end point nodes simultaneously.

A communications link may be formed using communications equipment and by establishing connections between the communications equipment. A communications link includes communications equipment located at each of the end point nodes. A communications link also may employ communications equipment located at one or more intermediate nodes between the end point nodes. Thus, a communications link between the end point nodes may be formed by the communications equipment operating at the end point nodes and at various intermediate nodes as well as the connections that are established between all of the nodes.

Communications equipment located at the end point nodes and intermediate nodes of a communications link may take many forms. Communications equipment may operate in various different ways to create various different types of connections between communications equipment to establish and maintain the communications link. For example, communications equipment may include transmitters, receivers, repeaters, antennae, user interface devices, and other hardware or hardware and software operating together to create a node in the communications link. Connections between communications equipment at the nodes in a communications link may employ various different transmission media and modes of operation. For example, connections between communications equipment may be established at various different radio, microwave, optical, or other frequencies over the air, wire, fiber optic cable, or other transmission media.

The communications equipment and connections that are used to establish any particular communications link may depend on the locations of the end point nodes of the communications link. For example, one end point node of the communications link may be located on the ground with the other end point node of the communications link located on an aircraft in flight. In this case, the communications equipment used to establish the communications link may include aircraft communications equipment on the aircraft, ground communications equipment on the ground, and communications equipment forming an intermediate air-to-ground communications system. The aircraft communications equipment may include end user equipment. The ground communications equipment may include ground user equipment. The air-to-ground communications system may include, for example, intermediate communications equipment, such as satellite-based and other communications equipment.

The quality of communications between the end point nodes in a communications link depends on the level of performance at the end point nodes and any intermediate nodes. For example, the level of performance of the communications equipment at the nodes in the communications link and the level of performance of the connections between the nodes affects the end-to-end quality of communications. Other factors or conditions also may affect the end-to-end quality of a communications link. For example, operations performed by human operators at the various nodes along a communications link may affect communications quality. External factors, such as weather or other natural or man-made environmental conditions also may affect the quality of communications via a communications link.

The quality of communications provided by a communications link is not static. The quality of communications changes over time as the various factors affecting the communications link change over time. For example, over the course of time that a communications link is in use, the level of performance of the communications equipment and connections forming the link may change. Over this time period, human operators may perform operations that affect operation of the link. Over this time period, environmental conditions affecting operation of the communications link may change. Some of these various changing conditions may be the result of movement of one or more of the nodes forming the communications link. For example, the quality of communications via a link to an aircraft in flight may change as the distance between the aircraft and other nodes in the communications link changes, as the aircraft flies through various different weather or other environmental conditions, or as movement of other nodes in the communications link affects operation of the link.

With all of the different components and conditions that may affect the quality of communications via a communications link at any point in time, analyzing communications to determine which factors or combination of factors affect communications quality may be more difficult than desired. For example, different software or other tools may be used to monitor individual components of a communications link or individual conditions that may affect operation of a communications link. These tools, however, may not provide a desired level of communications link monitoring and analysis.

Accordingly, it would be advantageous to have a method and apparatus that takes into account one or more of the issues discussed above as well as possibly other issues.

SUMMARY

An embodiment of the present disclosure provides a method for analyzing a communications link. Parameters associated with a level of performance of a number of nodes are identified. The number of nodes comprise end nodes and a number of intermediate nodes providing a communications link between the end nodes. Locations of selected ones of the nodes are identified. The parameters and the locations are displayed and a representation of communications between the end nodes via the communications link is presented based on the parameters. The parameters and locations are displayed simultaneously with each other and simultaneously with the representation of communications between the end nodes for the same point in time.

Another embodiment of the present disclosure provides an apparatus comprising a display device and a processor unit. The processor unit is configured to identify parameters associated with a level of performance of a number of nodes, the number of nodes comprising end nodes and a number of intermediate nodes providing a communications link between the end nodes, to identify locations of selected ones of the nodes, to display on the display device the parameters and the locations, and to present on the display device a representation of communications between the end nodes via the communications link based on the parameters. The parameters and locations for a same point in time are displayed simultaneously and the representation of communications between the end nodes is presented simultaneously with the displayed parameters and locations for the same point in time.

Another embodiment of the present disclosure provides a computer program product for analyzing a communications link. The computer program product comprises program instructions stored on a computer readable storage medium. The program instructions comprise program instructions to identify parameters associated with a level of performance of a number of nodes, the number of nodes comprising end nodes and a number of intermediate nodes providing a communications link between the end nodes, to identify locations of selected ones of the number of nodes, to display the parameters and the locations simultaneously for the same point in time, and to present a representation of communications between the end nodes via the communications link based on the parameters simultaneously with the display of the parameters and the locations and for the same point in time.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of advantageous embodiments of the present disclosure when read in conjunction with the accompanying drawings, wherein:

FIG. 9 is an illustration of a data processing system in accordance with an advantageous embodiment.

DETAILED DESCRIPTION

Figure 1:
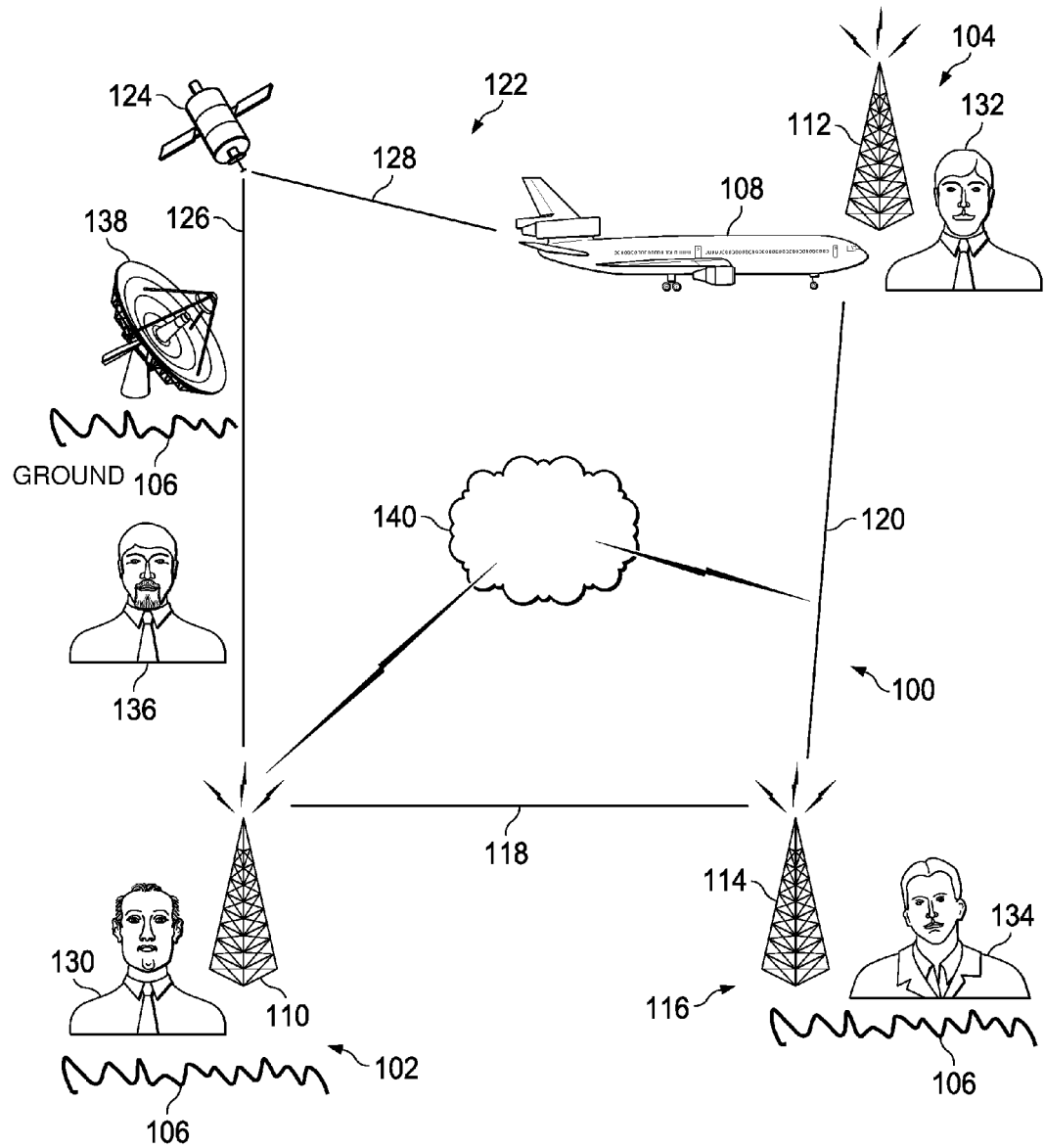
FIG. 1 is an illustration of communications links to an aircraft in flight in accordance with an advantageous embodiment.

The different advantageous embodiments recognize and take into account a number of different considerations. For example, the different advantageous embodiments recognize and take into account that modern communications systems tend to be amalgamations of many discrete systems. Therefore, if the quality of communications via a communications link drops, it may be difficult to determine the cause or multiple causes of the quality drop because many different systems or other factors may contribute to such a change in communications link quality. For example, if a phone call is dropped onboard an aircraft used for executive transport, it may be difficult to pinpoint the cause or multiple causes of the drop because many factors could have played contributing roles. These factors might include operational activities by call operators and users, interoperability between communications systems on the ground, in the air, or in space, system performance changes due to atmospheric events, or movement by airborne or space assets, performance impacts from other users, and other factors.

The different advantageous embodiments recognize and take into account that traditional tools provide for the analysis of individual systems forming a communications link. Examples of such tools include network models, system diagrams, and the Department of Defense Architecture framework. However, the usefulness of these tools for locating the causes of changes in end-to-end communications quality via a communications link are limited because results are not integrated, and cross-node effects and an end-to-end view of communications quality are not presented. Furthermore, the analysis results provided by such tools only describe the performance of communications systems forming the communications link in a quantitative manner. The traditional tools for analyzing communications quality do not illustrate the impact of communications system performance on communications quality in a way that the average user can comprehend.

The different advantageous embodiments also recognize and take into account that current methods for analyzing a communications link may employ various different tools for analyzing various different systems, factors, or conditions that may affect end-to-end communications link quality. In current methods, the data from multiple tools is integrated manually. Manual integration of the data from multiple tools results in slower turnaround time and may result in errors in analyzing the communications link. For example, currently, communications system performance may be analyzed using modeling tools, such as Opnet. Behavior of human operators may be analyzed in architecture tools, such as Rhapsody. Subjective quality of communications may be determined using quality of experience modeling tools, such as the E-Model. Data from these various tools may be manually integrated and manually analyzed. If changes are made to one of the factors affecting communications quality, the impact on the analysis of other factors is unknown unless the entire process is re-run.

In accordance with an advantageous embodiment, analysis of a communications link may be improved by presenting simultaneously and in a time-synchronized manner both a representation of the quality of communications via the link and a display of various conditions or parameters that may affect such quality. For example, without limitation, an advantageous embodiment may be employed to improve analysis of a communications link between an end point node on the ground and an end point node on an aircraft in flight.

Turning first to FIG. 1, an illustration of two such communications links to an aircraft in flight is depicted in accordance with an advantageous embodiment. In FIG. 1, communications link 100 is an example of a first communications link between end point node 102 and end point node 104. For purposes of the present application, including in the claims, a "node" in a communications link comprises communications equipment and connections between communications equipment at a particular location. Communications via a communications link is passed through the nodes forming the communications link by the communications equipment and connections at the various node locations. A combination of communications equipment and connections associated with a node at a particular location or associated with multiple nodes at multiple locations also may be referred to as a communications system.

In this example, end point node 102 is located on ground 106, and end point node 104 is located on aircraft 108. For purposes of the present application, including in the claims, a node that is "on the ground" or "ground-based" or that is referred to using any similar term or terms includes a node that is located on, near, or below the surface of the earth, including on or below water. Aircraft 108 may be in flight above ground 106.

Communications between end point node 102 and end point node 104 is provided by communications link 100. Communications link 100 comprises end point node 102, end point node 104, and intermediate node 116. More specifically, communications link 100 is formed by communications equipment 110 associated with end point node 102 located at a first location on ground 106, communications equipment 112 associated with end point node 104 located on aircraft 108, communications equipment 114 associated with intermediate node 116 located at a second location on ground 106, connection 118 between communications equipment 110 and communications equipment 114, and connection 120 between communications equipment 112 and communications equipment 114.

Communications link 122 is an example of a second communications link between end point node 102 and end point node 104. Communications link 122 also provides for communications between end point node 102 and end point node 104. Communications link 122 comprises end point node 102, end point node 104, and intermediate satellite node 124. More specifically, communications link 122 is formed by communications equipment 110 associated with end point node 102 located on ground 106, communications equipment 112 associated with end point node 104 located on aircraft 108, communications equipment on intermediate satellite node 124, connection 126 between communications equipment 110 and intermediate satellite node 124, and connection 128 between communications equipment 112 and intermediate satellite node 124.

Communications links 100 and 122 may support various types of communications between end point nodes 102 and 104. For example, communications links 100 and 122 may support audio, video, audio and video, or digital data communications between end point nodes 102 and 104. Communications links 100 and 122 may support multiple types of communications between end point nodes 102 and 104 simultaneously.

Communications equipment 110, 112, and 114 and satellite node 124 may take many forms and may operate in various different ways to create connections 118, 120, 126, and 128. For example, communications equipment 110, 112, and 114 and satellite node 124 may include transmitters, receivers, repeaters, antennae, user interface devices, and other hardware or hardware and software operating together to perform the communication functions of end point nodes 102 and 104, intermediate node 116, and intermediate satellite node 124. Connections 118, 120, 126, and 128 may employ various different transmission media and modes of operation. For example, connections 118, 120, 126, and 128 may be established at various different radio, microwave, optical, or other frequencies over the air, through space, or via wire, fiber optic cable, or other transmission media. Communications equipment 110 in end point node 102 may include ground communications equipment including ground user equipment. Communications equipment 112 in end point node 104 may include aircraft communications equipment including end user equipment on aircraft 108. Communications equipment 114 in intermediate node 116 and intermediate satellite node 124 may comprise air-to-ground communications equipment for supporting an air-to-ground communications link between end point nodes 102 and 104.

The quality of communications between the end point nodes of a communications link may be referred to as the "end-to-end" quality of communications. The end-to-end quality of communications between end point nodes 102 and 104 via communications link 100 or 122 depends on the level of performance of end point nodes 102 and 104 and the level of performance of intermediate node 116 or intermediate satellite node 124, respectively. For example, the level of performance of communications equipment 110, 112, and 114 and connections 118 and 120 affects the end-to-end quality of communications between end point nodes 102 and 104 via communications link 100. Similarly, the level of performance of communications equipment 110 and 112 of intermediate satellite node 124 and of connections 126 and 128 affects the end-to-end quality of communications between end point nodes 102 and 104 via communications link 122.

Other factors or conditions also may affect the end-to-end quality of communications via communications links 100 and 122. For example, operations performed by human operators 130, 132, 134 or 136 may affect the quality of communications. Operations performed by human operator 130 at end point node 102, human operator 134 at intermediate node 116, or human operator 132 on aircraft 108 at end point node 104 may affect the quality of end-to-end communications via communications link 100. Operations performed by human operator 130 at end point node 102 or by human operator 132 on aircraft 108 at end point node 104 may affect the quality of end-to-end communications via communications link 122. Operations performed by human operator 136 at ground control station 138 for intermediate satellite node 124 also may affect the quality of end-to-end communications via communications link 122.

External factors also may affect the quality of communications via communications links 100 and 122. For example, weather, such as severe weather conditions 140 may affect the quality of communications via communications links 100 and 122. Other external factors, such as other natural or man-made environmental conditions may affect the quality of communications via communications links 100 and 122.

The quality of communications between end point nodes 102 and 104 via communications links 100 and 122 may change over time as the various factors that may affect communications links 100 and 122 change over time. The quality of communications via communications links 100 and 122 at any point in time may depend on such factors as the level of performance of communications equipment 110, 112, and 114, the level of performance of intermediate satellite node 124, the level of performance of connections 118, 120, 126, and 128, the relative positions of end point nodes 102 and 104, intermediate node 116, and intermediate satellite node 124, operations performed by human operators 130, 132, 134, and 136, and relevant external factors, such as severe weather conditions 140 at that point in time.

The illustration of FIG. 1 is not meant to imply physical or architectural limitations to the manner in which different advantageous embodiments may be implemented. Other components in addition to and/or in place of the ones illustrated may be used. For example, one or both of end point nodes 102 and 104 may be on ground 106, on an aircraft in flight, on a spacecraft, or on a surface or submarine water craft in any combination. Also, communication links 100 and 122 may include more or fewer or different intermediate communication nodes from those illustrated by example in FIG. 1.

Figure 2:
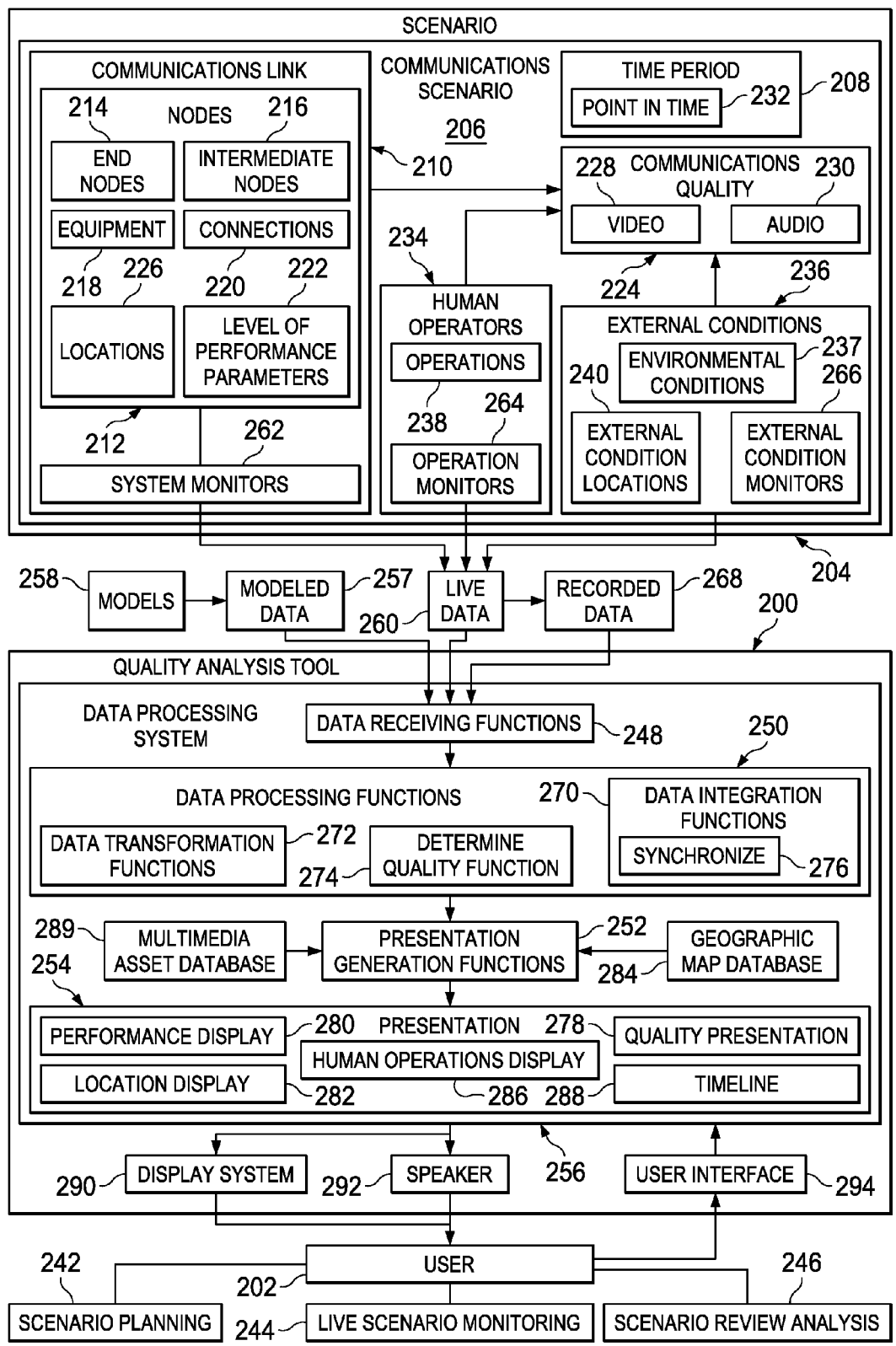
FIG. 2 is a block diagram of an apparatus for analyzing the quality of communications in a communications scenario in accordance with an advantageous embodiment.

Turning now to FIG. 2, a block diagram of an apparatus for analyzing the quality of communications in a communications scenario is depicted in accordance with an advantageous embodiment. In accordance with an advantageous embodiment, quality analysis tool 200 may be employed by user 202 to analyze and manage the quality of the result of scenario 204. Quality analysis tool 200 may, therefore, also be used as a quality management tool. In accordance with an advantageous embodiment, scenario 204 may be communications scenario 206.

Communications scenario 206 may unfold over time period 208. Communications link 210 may be in operation for at least a portion of time period 208. For example, without limitation, communications link 210 may be established, modified, or terminated during time period 208. Communications link 210 may comprise number of nodes 212. For example, nodes 212 may comprise end nodes 214 and intermediate nodes 216. Communications may originate and terminate at one or more end nodes 214. Intermediate nodes 216 provide the link for communications between end nodes 214.

Each of nodes 212 may include equipment 218. Equipment 218 may comprise any appropriate communications hardware or hardware and software operating in combination to implement the communications functions of nodes 212. For example, without limitation, equipment 218 may include transmitters, receivers, repeaters, antennae, user interface devices, and other hardware or hardware and software operating together to implement the communications functions of nodes 212.

Equipment 218 associated with nodes 212 may operate in various different ways to create connections 220 between nodes 212 to establish and maintain communications link 210. Connections 220 may be established between equipment 218 at nodes 212 over various transmission media and using various modes of operation. For example, connections 220 between nodes 212 may be implemented at various radio, microwave, optical, or other frequencies via the air, space, wire, fiber optic cable, or other transmission media.

Level of performance parameters 222 may include data in any form that indicates a level of performance of nodes 212 that may affect or may be relevant to communications quality 224 via communications link 210. Level of performance parameters 222 may be quantified by numbers that provide an indication of the operation of nodes 212 as such operation may affect or may be relevant to communications quality 224. Operation of nodes 212 may be measured in a number of different ways to obtain quantitative level of performance parameters 222. For example, quantitative level of performance parameters 222 may be obtained by measuring the throughput, jitter, latency, error rate, or any other parameter relevant to communications quality resulting from operation of nodes 212.

In general, as used herein, "operation" of a node, communications equipment, a connection, or of a communications link refers to the working of the node, equipment, connection, or link to provide communications via the communications link. Therefore, any factor or condition that affects operation of a node, communications equipment, connection, or communications link may affect the quality of communications via the communications link.

Nodes 212 of communications link 210 may be associated with locations 226. Locations 226 may be specific locations of nodes 212, such as locations where equipment 218 is located or locations associated with an area or volume of effect of nodes 212 or both. For example, if nodes 212 are radio receiver/transmitters, locations 226 associated with such nodes may include the individual locations of such receiver/transmitters, the geographic area in the effective range of the receiver/transmitters, or both. As another example, if nodes 212 are communications satellites, locations 226 associated with such nodes 212 may include the locations in orbit of the communications satellites, the effective footprints on the surface of the earth of the communications satellites, or both. Locations 226 may be geographic locations on the surface of the earth, locations below or above the surface of the earth, including locations under water or locations in space. Locations 226 may be expressed in and translated into any coordinate or other reference system as desired in any known manner.

Communications quality 224 is the quality of communications between end nodes 214 via communications link 210. Communications quality 224 may be referred to as end-to-end communications quality. Communications quality 224 may be expressed quantitatively or qualitatively using known standards and measures of quality. For purposes of the present application, a quantitative representation of communications quality 224 may be presented as a number or as a graphical representation of a number. For purposes of the present application, a qualitative representation of communications quality 224 may be a representation in a form that indicates how subjects, such as human operators at end nodes 214 would perceive communications via communications link 210. Therefore, a qualitative representation of communications quality 224 also may be referred to as a subjective representation of communications quality.

The definition or measure of communications quality 224 will vary depending upon the type of communications via communications link 210. For example, if video 228 is being communicated between end nodes 214 via communications link 210, then communications quality 224 may be defined in terms of the quality of video output that can be presented at end nodes 214 from received video communications. Similarly, if audio 230 is being communicated via communications link 210, then communications quality 224 may be defined in terms of the quality of audio output that can be presented at end nodes 214 from received audio communications. Communications quality 224 may be defined differently, both quantitatively and qualitatively for video 228 and audio 230.

Communications quality 224 may be defined or measured differently depending on how video 228 or audio 230 is communicated via communications link 210. For example, different quantitative measurements or parameters may be used to indicate communications quality 224 for analog communications and digital communications of video 228 or audio 230 via communications link 210. On the other hand, a qualitative measure of communications quality 224 may be the same for both analog and digital communication of video 228 or audio 230.

As mentioned above, communications quality 224 at any point in time 232 is affected by the performance of equipment 218 and connections 220 of nodes 212 at that point in time 232 as indicated by level of performance parameters 222. Communications quality 224 at any point in time 232 also may be affected by other factors or conditions. For example, communications quality 224 may be affected by operations performed by human operators 234 and by external conditions 236.

Human operators 234 may be located at any of nodes 212 of communications link 210. Human operators 234 also may be located at other locations and may affect operation of nodes 212 remotely from such other locations. Human operators 234 may affect communications quality 224 by performing various operations 238. Operations 238 may include interactions by human operators 234 with equipment 218 or connections 220 that affect operation of communications link 210 and therefore, affect communications quality 224. Examples of operations 238 may include a human operator picking up a telephone receiver to initiate a call via communications link 210 or a human operator hanging up a telephone receiver to terminate a call via communications link 210. Operations 238 may include any interaction by human operators 234 with communications link 210 that may affect communications quality 224.

External conditions 236 are external to communications link 210 but affect operation of communications link 210. Specifically, external conditions 236 may include any conditions or events that are external to communications link 210 but that may affect communications quality 224 via communications link 210. For example, external conditions 236 may include various environmental conditions 237. Environmental conditions 237 may include various natural atmospheric conditions, such as weather conditions and other natural or man-made environmental conditions.

External conditions 236 may be associated with external condition locations 240. External condition locations 240 may be specific locations of external conditions 236 or locations associated with an area or volume of effect of external conditions 236 or both. For example, if external conditions 236 include severe weather, then external condition locations 240 may include the areas affected by a storm at a particular point in time 232. External condition locations 240 may be geographic locations on the surface of the earth, locations below or above the surface of the earth including locations under water, or locations in space. External condition locations 240 may be expressed in and translated into any coordinate or other reference system as desired in any known manner.

In accordance with an advantageous embodiment, quality analysis tool 200 provides user 202 with an integrated view of communications scenario 206 that allows user 202 to analyze and manage communications scenario 206 more effectively and efficiently. These advantages are achieved by presenting to user 202 an indication of communications quality 224 at any point in time 232 simultaneously with an indication of the various factors and conditions that may affect communications quality 224 at that point in time 232. These factors and conditions may include the level of performance of nodes 212 forming communications link 210, operations 238 affecting communications link 210, and external conditions 236. User 202 may use quality analysis tool 200 for scenario planning 242, live scenario monitoring 244, and scenario review analysis 246.

In accordance with an advantageous embodiment, quality analysis tool 200 employs data receiving functions 248, data processing functions 250, and presentation generation functions 252 to generate presentation 254. Data receiving functions 248, data processing functions 250, and presentation generation functions 252 may be implemented in data processing system 256. As will be discussed in more detail below, data processing system 256 may comprise a computer processor unit or other system or device that is configured to perform the functions of quality analysis tool 200 as described herein. For example, data processing system 256 may comprise any computer or other programmable system or device that may run software in the form of program instructions to perform the functions of quality analysis tool 200 as described herein.

Data receiving functions 248 comprise functions for receiving data that will be used to generate presentation 254 in accordance with an advantageous embodiment. For example, data receiving functions 248 may include functions for receiving level of performance parameters 222 for nodes 212 of communications link 210, for receiving data indicating operations 238 of human operators 234, and for receiving data indicating external conditions 236, including external condition locations 240. Data receiving functions 248 also may include functions for receiving data indicating locations 226 of selected ones of nodes 212.

The source of the data received by data receiving functions 248 may depend on the analysis that is being performed by user 202 using quality analysis tool 200. For example, for scenario planning 242, user 202 may employ quality analysis tool 200 to analyze different possible versions of communications scenario 206. In this case, data receiving functions 248 may receive modeled data 257. Modeled data 257 may be generated by one or more computer models 258. For example, models 258 may simulate operation of communications link 210, human operations 238, and external conditions 236 for different possible versions of communications scenario 206.

For live scenario monitoring 244, user 202 may employ quality analysis tool 200 to monitor and manage communications scenario 206 as it unfolds in real-time or near real-time. In this case, data receiving functions 248 may receive live data 260.

Live data 260 may include data provided by system monitors 262. System monitors 262 may monitor levels of performance of nodes 212 of communications link 210 and provide real-time or near real-time level of performance parameters 222 to data receiving functions 248. Implementation of system monitors 262 will depend upon the implementation of nodes 212 being monitored and the specific level of performance parameters 222 to be provided. System monitors 262 also may provide information regarding locations 226 of nodes 212 to data receiving functions 248. In particular, it may be desirable to provide real-time or near real-time information to data receiving functions 248 regarding locations 226 of nodes 212 that may be moving during communications scenario 206. Examples of nodes 212 that may be moving include nodes 212 on a moving vehicle, such as nodes 212 on an aircraft in flight. In other cases, locations 226 of nodes 212 may be obtained by quality analysis tool 200 from an appropriate database for nodes 212 associated with known stationary locations 226.

Live data 260 also may include data provided by operation monitors 264. Operation monitors 264 may detect and provide indications of operations 238 performed by human operators 234 to data receiving functions 248. Live data 260 also may include data provided by external condition monitors 266. External condition monitors 266 may provide real-time or near real-time information regarding external conditions 236, including external condition locations 240 to data receiving functions 248. The implementation of system monitors 262, operation monitors 264, and external condition monitors 266 will depend upon the particular systems, operations, or events to be monitored, detected, and reported. For example, external condition monitors 266 for monitoring severe weather conditions may include weather radar.

For scenario review analysis 246, user 202 may analyze communications scenario 206 that occurred in the past. In this case, data receiving functions 248 may receive recorded data 268. Recorded data 268 may comprise live data 260 obtained during communications scenario 206 that is recorded for later scenario review analysis 246 by user 202.

Data received by data receiving functions 248 is processed by data processing functions 250. Data processing functions 250 may include data integration functions 270, data transformation functions 272, and determine quality function 274.

Data integration functions 270 integrate the data received by data receiving functions 248. In particular, data integration functions 270 synchronize 276 the data received by data receiving functions 248. Data integration functions 270 may synchronize 276 level of performance parameters 222 and locations 226 of nodes 212 at point in time 232 with human operations 238 occurring at the same point in time 232 and with external conditions 236 and external condition locations 240 at that same point in time 232. For example, data integration functions 270 may synchronize 276 data received by data receiving functions 248 using time stamps accompanying such data or by any other appropriate method.

Data transformation functions 272 change data received by data receiving functions 248 into an appropriate form for use by presentation generation functions 252 to generate presentation 254. The implementation of data transformation functions 272 will depend on the type and format of data received by data receiving functions 248.

Determine quality function 274 determines communications quality 224 from data received by data receiving functions 248. In other words, determine quality function 274 determines end-to-end quality of communications between end nodes 214 via communications link 210 based on level of performance parameters 222 and other factors or conditions affecting communications quality 224 as may be indicated by the data received by data receiving functions 248. Any known method or algorithm for determining communications quality 224 from the data received by data receiving functions 248 may be used to implement determine quality function 274.

Presentation generation functions 252 generate presentation 254 from the integrated and transformed data and communications quality provided by data processing functions 250. In accordance with an advantageous embodiment, presentation 254 may include quality presentation 278, performance display 280, location display 282, human operations display 286, and timeline 288. In accordance with an advantageous embodiment, quality presentation 278, performance display 280, location display 282, human operations display 286, and timeline 288 are presented simultaneously to user 202 as part of presentation 254. Furthermore, in accordance with an advantageous embodiment, quality presentation 278, performance display 280, location display 282, human operations display 286, and timeline 288 are presented in a time-synchronized manner. Therefore, in accordance with an advantageous embodiment, user 202 is able to view a representation of communications quality 224 at point in time 232 simultaneously along with displays of various factors or conditions that may be affecting communications quality 224 at that same point in time 232. This allows user 202 to quickly and accurately analyze the interaction among various factors and conditions that result in communications quality 224 at point in time 232.

Quality presentation 278 may comprise a presentation of communications quality 224 at point in time 232 as determined by determine quality function 274. Quality presentation 278 may include a quantitative presentation of communications quality 224, a qualitative presentation of communications quality 224, or both. The quantitative presentation of communications quality 224 may comprise a numerical presentation, a graphical presentation, or both. The qualitative presentation of communications quality 224 may depend on the type of communications represented. For example, communications quality 224 for video 228 may be presented as a video display with the quality of the video displayed for point in time 232 corresponding to communications quality 224 at point in time 232. Communications quality 224 for audio 230 may be presented as an audio presentation with the quality of the audio presentation for point in time 232 corresponding to communications quality 224 for point in time 232.

In some applications, video or audio for a qualitative presentation of communications quality 224 may be obtained from multimedia asset database 289. For example, multimedia asset database 289 may include multiple pre-recorded or pre-generated video and audio clips of various quality. In this case, the qualitative presentation of communications quality may be provided by selecting from multimedia asset database 289 an appropriate video or audio clip having a quality that reflects communications quality 224. In another example, an appropriate video or audio clip from multimedia asset database 289 may be manipulated using known techniques to reflect communications quality 224. In other applications, video or audio for a qualitative presentation of communications quality 224 may be generated to reflect communications quality 224. In an application where live data 260 or recorded data 268 is being used, the video or audio for a qualitative presentation of communications quality 224 may include the actual live or recorded video 228 or audio 230 that is received or that was received at end nodes 214.

Performance display 280 may comprise a display of level of performance parameters 222 and/or other information indicating operation of nodes 212 relevant to communications quality 224. Performance display 280 also may comprise a display of end-to-end level of performance parameters 222 or other information that was used to generate quality presentation 278 of end-to-end communications quality 224. Level of performance parameters 222 or other information displayed as part of performance display 280 may be presented numerically, graphically, or both numerically and graphically. In accordance with an advantageous embodiment, performance display 280 may be displayed simultaneously with quality presentation 278 and in a time-synchronized manner such that information for the same point in time 232 is presented simultaneously in performance display 280 and quality presentation 278.

Location display 282 may comprise a display of locations 226 of nodes 212 and external condition locations 240. For example, location display 282 may comprise a display of locations 226 of nodes 212 and external condition locations 240 overlaid simultaneously on a map of a geographic area. In this case, presentation generation functions 252 may employ geographic map data stored in geographic map database 284 to generate location display 282. In accordance with an advantageous embodiment, location display 282 may be displayed simultaneously with performance display 280 and quality presentation 278 and in a time-synchronized manner such that information for the same point in time 232 is presented simultaneously in location display 282, performance display 280 and quality presentation 278.

Human operations display 286 may comprise a display indicating the occurrence of operations 238 performed by human operators 234. For example, human operations display 286 may include displays of indicators that identify operations 238 performed by human operators 234. Such indicators also may indicate when operations 238 were performed and may identify human operators 234 that performed operations 238. Such indicators may be displayed as part of presentation 254 simultaneously with location display 282, performance display 280 and quality presentation 278 in a time-synchronized manner. For example, such indicators may initially appear in human operations display 286 at a time corresponding to point in time 232 at which the corresponding operations 238 take place and for which information is being presented simultaneously in location display 282, performance display 280 and quality presentation 278.

Timeline 288 may be a graphical or other representation of time period 208 or of a portion of time period 208. In accordance with an advantageous embodiment, timeline 288 may be displayed simultaneously with human operations display 286, location display 282, performance display 280 and quality presentation 278. The position of an indicator on timeline 288 may indicate point in time 232 for which information is being presented simultaneously in location display 282, performance display 280 and quality presentation 278. Other indicators on timeline 288 may indicate the times of occurrence of relevant events. For example, other indicators on timeline 288 may indicate the times at which human operators 234 perform certain operations 238.

Presentation 254 may be presented to user 202 on display system 290. Display system 290 may be implemented in hardware and may include display devices, such as a monitor or similar display. An audio portion of presentation 254, such as a qualitative presentation of communications quality 224 for audio 230 may be presented on speaker 292. Speaker 292 may be part of or separate from display system 290. Display system 290, speaker 292, or both may be connected to or be a part of data processing system 256.

User interface 294 may be provided to allow user 202 to interact with quality analysis tool 200. For example, user interface 294 may include a graphical user interface with which user 202 interacts using one or more input devices. Known input devices, such as a keyboard, mouse, or touch screen may be used. Such input devices may be connected to or may be a part of data processing system 256 or display system 290. User interface 294 may be implemented as part of presentation 254 and may allow user 202 to control presentation 254. For example, user interface 294 may allow user 202 to select the source of data to be received by data receiving functions 248 and to control playback of presentation 254.

The illustration of FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, presentation 254 need not include all of quality presentation 278, performance display 280, location display 282, human operations display 286, and timeline 288. A subset of quality presentation 278, performance display 280, location display 282, human operations display 286 and timeline 288 provided as parts of presentation 254 will provide user 202 with an improved ability to monitor and manage communications via communications link 210. Furthermore, quality presentation 278, performance display 280, location display 282, human operations display 286 and timeline 288 may present information in various ways that may be different from those described herein.

Figure 3:
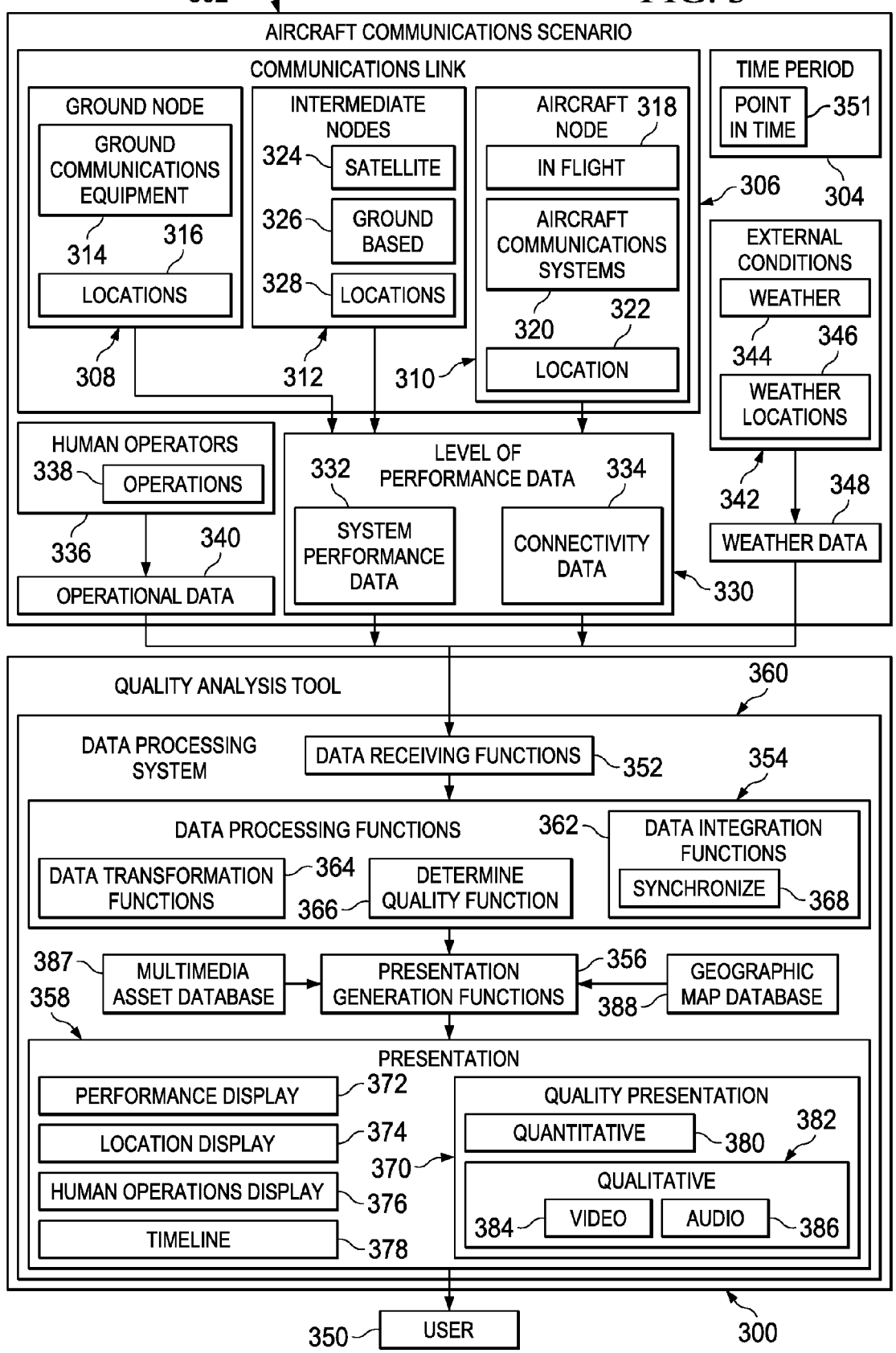
FIG. 3 is a block diagram of an apparatus for analyzing the quality of communications via a communications link from the ground to an aircraft in flight in accordance with an advantageous embodiment.

Turning to FIG. 3, a block diagram of an apparatus for analyzing the quality of communications via a communications link from the ground to an aircraft in flight is depicted in accordance with an advantageous embodiment. In this example, quality analysis tool 300 is one example of quality analysis tool 200 in FIG. 2. In this example, aircraft communications scenario 302 is one example of communications scenario 206 in FIG. 2.

Aircraft communications scenario 302 unfolds over time period 304. Communications link 306 is established during time period 304. Communications link 306 provides communications between ground node 308 and aircraft node 310 via a number of intermediate nodes 312.

Ground node 308 is located on the ground. Ground node 308 comprises ground communications equipment 314. Ground node 308 may be located at ground node location 316. For example, ground node location 316 may be a fixed location.

Aircraft node 310 is located on an aircraft in flight 318. Aircraft node 310 may comprise aircraft communications systems 320. For example, aircraft communications systems 320 may comprise end user equipment on board the aircraft. Aircraft node 310 may be located at aircraft location 322. Since aircraft node 310 is located on an aircraft in flight 318, aircraft location 322 may be changing during time period 304.

Intermediate nodes 312 comprise air-to-ground communications systems. For example, intermediate nodes 312 may include a number of satellite communications systems 324, a number of ground-based communications systems 326, or both. Intermediate nodes 312 are associated with a number of corresponding intermediate node locations 328.

In accordance with an advantageous embodiment, operation of communications link 306 may be defined by level of performance data 330. Level of performance data 330 describes operation of the components of communications link 306 as such operation may affect the quality of communications between ground node 308 and aircraft node 310 via communications link 306. Level of performance data 330 may include system performance data 332 for communications systems associated with ground node 308, aircraft node 310, and intermediate nodes 312. Level of performance data 330 also may include connectivity data 334 for connections between ground node 308, aircraft node 310, and intermediate nodes 312.

During aircraft communications scenario 302, human operators 336 may perform operations 338 related to communications link 306. Operations 338 may affect operation of communications link 306. Therefore, operations 338 may affect the quality of communications between ground node 308 and aircraft node 310 via communications link 306. In accordance with an advantageous embodiment, operational data 340 may indicate the performance of operations 338 by human operators 336.

External conditions 342 also may affect communications between ground node 308 and aircraft node 310 via communications link 306. For example, weather 344, such as severe weather or other atmospheric conditions may affect the quality of communications between ground node 308 and aircraft node 310. Weather 344 may be associated with a number of weather locations 346. Weather locations 346 may include geographic areas or other regions that are affected by weather 344. In particular, weather locations 346 may include geographic areas or other regions that are affected by weather 344 in a manner that may affect the quality of communications via communications link 306. In accordance with an advantageous embodiment, weather data 348 may provide information regarding weather 344 and weather locations 346.

In accordance with an advantageous embodiment, quality analysis tool 300 provides user 350 with an integrated view of aircraft communications scenario 302 that allows user 350 to analyze and manage aircraft communications scenario 302 more effectively and efficiently. These advantages are achieved by presenting to user 350 an indication of end-to-end communications quality between ground node 308 and aircraft node 310 at any point in time 351 simultaneously with an indication of the various factors and conditions that may affect end-to-end communications quality at that point in time 351.

In accordance with an advantageous embodiment, quality analysis tool 300 employs data receiving functions 352, data processing functions 354, and presentation generation functions 356 to generate presentation 358. Data receiving functions 352, data processing functions 354, and presentation generation functions 356 may be implemented in data processing system 360. For example, data processing system 360 may comprise any computer or other programmable system or device that may run software in the form of program instructions to perform the functions of quality analysis tool 300 as described herein.

Data receiving functions 352 comprise functions for receiving data that will be used to generate presentation 358 in accordance with an advantageous embodiment. For example, data receiving functions 352 may comprise functions for receiving level of performance data 330, operational data 340, and weather data 348. As discussed above, the source of the data received by data receiving functions 352 may depend on the analysis that is being performed by user 350 using quality analysis tool 300. The data received by data receiving functions 352 may include live data, recorded data, modeled data, or a combination of these different types of data.

Data received by data receiving functions 352 is processed by data processing functions 354. Data processing functions 354 may include data integration functions 362, data transformation functions 364, and determine quality function 366. Data integration functions 362 integrate the data received by data receiving functions 352. In particular, data integration functions 362 operate to synchronize 368 data received by data receiving functions 352. Data transformation functions 364 change data received by data receiving functions 352 into an appropriate form for use by presentation generation functions 356. Determine quality function 366 determines end-to-end quality of communications between ground node 308 and aircraft node 310 via communications link 306 based on level of performance data 330 and other factors or conditions that may affect communications quality on communications link 306. Any known method or algorithm for determining communications quality from the data received by data receiving functions 352 may be used to implement determine quality function 366.

Presentation generation functions 356 generate presentation 358 from the integrated and transformed data and communications quality provided by data processing functions 354. In accordance with an advantageous embodiment, presentation 358 may include quality presentation 370, performance display 372, location display 374, human operations display 376, and timeline 378. In accordance with an advantageous embodiment, quality presentation 370, performance display 372, location display 374, human operations display 376, and timeline 378 are presented simultaneously and in a time-synchronized manner to user 350 as part of presentation 358.

Quality presentation 370 may comprise a presentation of end-to-end communications quality between ground node 308 and aircraft node 310 via communications link 306 at point in time 351 as determined by determine quality function 366. Quality presentation 370 may include quantitative 380 presentation of communications quality, qualitative 382 presentation of communications quality or both. Quantitative 380 presentation of communications quality may be a numerical presentation, a graphical presentation, or both. Qualitative 382 presentation of communications quality may depend on the type of communications represented. For example, communications quality for video communications may be presented as video 384. Video 384 is a video representation of communications with the quality of video 384 displayed for point in time 351 corresponding to communications quality at point in time 351. Communications quality for audio communications may be presented as audio 386. Audio 386 is an audio representation of communications with the quality of audio 386 presented for point in time 351 corresponding to communications quality for point in time 351. As discussed above, video 384 or audio 386 for qualitative 382 quality presentation 370 may be obtained from multimedia asset database 387.

Performance display 372 may comprise a display of level of performance data 330 and/or other information indicating operation of ground node 308, aircraft node 310, and intermediate nodes 312 relevant to end-to-end communications quality via communications link 306. Performance display 372 also may comprise a display of end-to-end level of performance data 330 or other information that was used to generate quality presentation 370 of end-to-end communications quality. Level of performance data 330 or other information displayed as part of performance display 372 may be presented numerically, graphically, or both numerically and graphically.

Location display 374 may comprise a display of locations 316, 328, and 322 associated with ground node 308, intermediate nodes 312, and aircraft node 310, and weather locations 346. For example, location display 374 may comprise a display of coverage areas associated with ground node 308 and intermediate nodes 312, location 322 of aircraft node 310, and areas affected by weather 344 that may affect operation of communications link 306 overlaid simultaneously on a map of a geographic area. In this case, presentation generation functions 356 may employ geographic map data stored in geographic map database 388 to generate location display 374. In accordance with an advantageous embodiment, location display 374 also may comprise a display of altitude information. For example, location display 374 may include a display of the altitude of aircraft node 310 or the effective altitude of weather 344 or both.

Human operations display 376 may comprise a display indicating the occurrence of operations 338 performed by human operators 336. For example, human operations display 376 may include displays of indicators that identify operations 338 performed by human operators 336. Such indicators also may indicate when operations 338 were performed and may identify human operators 336 that performed operations 338.

Timeline 378 may be a graphical or other representation of time period 304 or of a portion of time period 304. The position of an indicator on timeline 378 may indicate point in time 351 for which information is being presented simultaneously in location display 374, performance display 372 and quality presentation 370. Other indicators on timeline 378 may indicate the times of occurrence of relevant events. For example, other indicators on timeline 378 may indicate the times at which human operators 336 perform certain operations 338.

Figure 4:
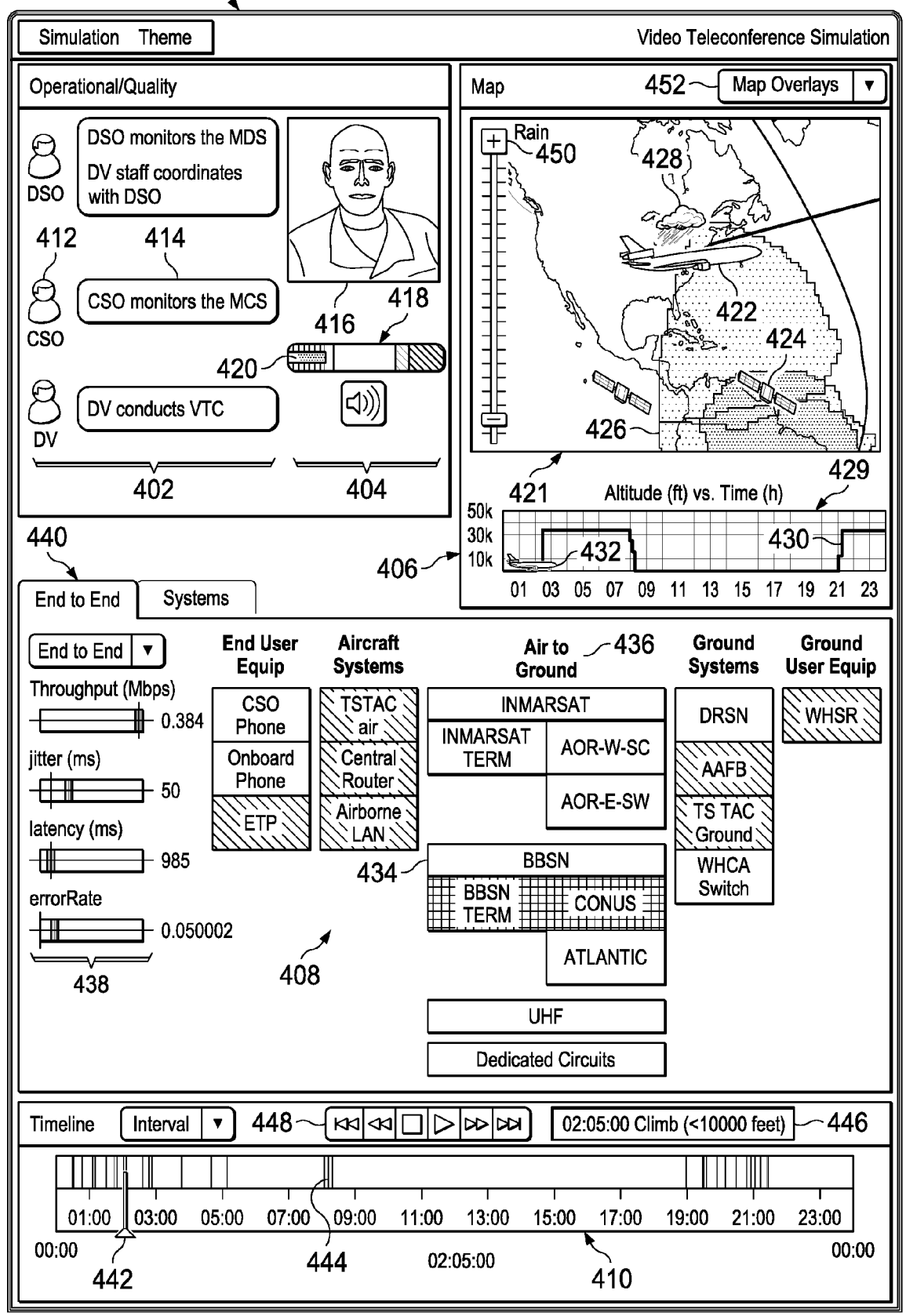
FIG. 4 is an example of a presentation for communications quality analysis in accordance with an advantageous embodiment.

Turning now to FIG. 4, an example of a presentation for communications quality analysis is depicted in accordance with an advantageous embodiment. In this example, presentation 400 is an example of presentation 254 that may be generated by quality analysis tool 200 in FIG. 2. Presentation 400 may be presented on display system 290 of FIG. 2. An audio portion of presentation 400 may be presented using a speaker. Example presentation 400 presents information for communications quality analysis in an aircraft communications scenario. Therefore, more particularly, in this example, presentation 400 is an example of presentation 358 that may be generated by quality analysis tool 300 of FIG. 3.

Presentation 400 comprises human operations display 402, quality presentation 404, location display 406, performance display 408, and timeline 410. Human operations display 402, quality presentation 404, location display 406, performance display 408, and timeline 410 are presented simultaneously in a time-synchronized manner. Thus, each of human operations display 402, quality presentation 404, location display 406, performance display 408, and timeline 410 in presentation 400 shows the status of a portion of an aircraft communications scenario at the same point in time.

Human operations display 402 may display indications 412 identifying human operators that may affect the communications scenario. Human operations display 402 also may display indications 414 identifying operations that have been or are being performed by the human operators identified by indications 412.

Quality presentation 404 may include qualitative presentation 416 and quantitative presentation 418. In this example, qualitative presentation 416 is provided as a video presentation showing the quality of video communications. The quality of the video image provided in qualitative presentation 416 for a point in time of the communications scenario indicates end-to-end quality of communications at that point in time. In this example, quantitative presentation 418 is provided as a color coded bar graph. The length of indicator 420 in quantitative presentation 418 indicates end-to-end quality of communications at the point in time quantitatively.

Location display 406 shows the location of various elements at a point in time of the communications scenario overlaid on map 421 of a geographic area. Element locations displayed on map 421 may include the location of aircraft 422 comprising an end point node of a communications link, locations of other communications system nodes 424 forming a communications link to aircraft 422, areas of coverage 426 associated with the various communications system nodes 424, and locations of weather 428 that may affect the communications link to aircraft 422. Appropriate graphical indicators or other symbols or markings may be used to indicate the locations of aircraft 422, communications system nodes 424, areas of coverage 426, and weather 428 on geographic map 421.

In this example, location display 406 may include altitude display 429. Altitude display 429 may be presented in the form of a timeline with line 430 on the timeline indicating the altitude throughout the communications scenario of the aircraft comprising the end point node of a communications link. Aircraft symbol 432 may be positioned on the timeline to indicate the point in time currently represented in location display 406 and the altitude of the aircraft at that point in time.

Performance display 408 displays the performance of the various nodes forming a communications link at a point in time. In this example, various components or functions performed at the various nodes forming a communications link are represented by labeled boxes 434. Groups of labeled boxes 434 are presented below labels 436 indicating the nodes of which they are a part. Coloring of labeled boxes 434 may be used to indicate the performance of the corresponding component or function as it relates to end-to-end communications quality. Different colors may be used to represent different levels of performance. Performance display 408 also may display various end-to-end performance parameters 438. In this example, the end-to-end performance parameters 438 are indicated using bar graphs and numerical values.

In accordance with an advantageous embodiment, performance parameters may be displayable in multiple user-selectable formats. In the example of FIG. 4, a user has selected tab 440 to display an "End to End" view of the performance parameters.

Timeline 410 illustrates a time period over which the communications scenario takes place. Timeline 410 may include indicator 442 positioned thereon. The position of indicator 442 on timeline 410 indicates the point in time represented by presentation 400. Therefore, as presentation 400 is played, indicator 442 moves along timeline 410. Other indicators 444 may be provided at various locations along timeline 410. Other indicators 444 indicate the times of occurrence of events of interest in the communications scenario. In general, other indicators 444 remain in place on timeline 410 as presentation 400 is played. However, a user may move indicators 444 on timeline 410 to change the time of occurrence of the represented events.

In accordance with an advantageous embodiment, presentation 400 also may include scenario message 446. Scenario message 446 may include a brief description of what is occurring in the communications scenario at the point in time represented in presentation 400.

Presentation 400 also may comprise various user interface controls. These user interface controls may allow a user to control what is presented in presentation 400 and/or how information is presented in presentation 400. For example, playback controls 448 may allow the user to control the speed at which presentation 400 is presented and to move back and forth between various points in time in presentation 400. Map control 450 may be provided to allow the user to zoom in and out on geographic map 421 in location display 406. Pull-down menu 452 may be provided to allow the user to select from among different maps to be used for geographic map 421 in location display 406.

Figure 5:
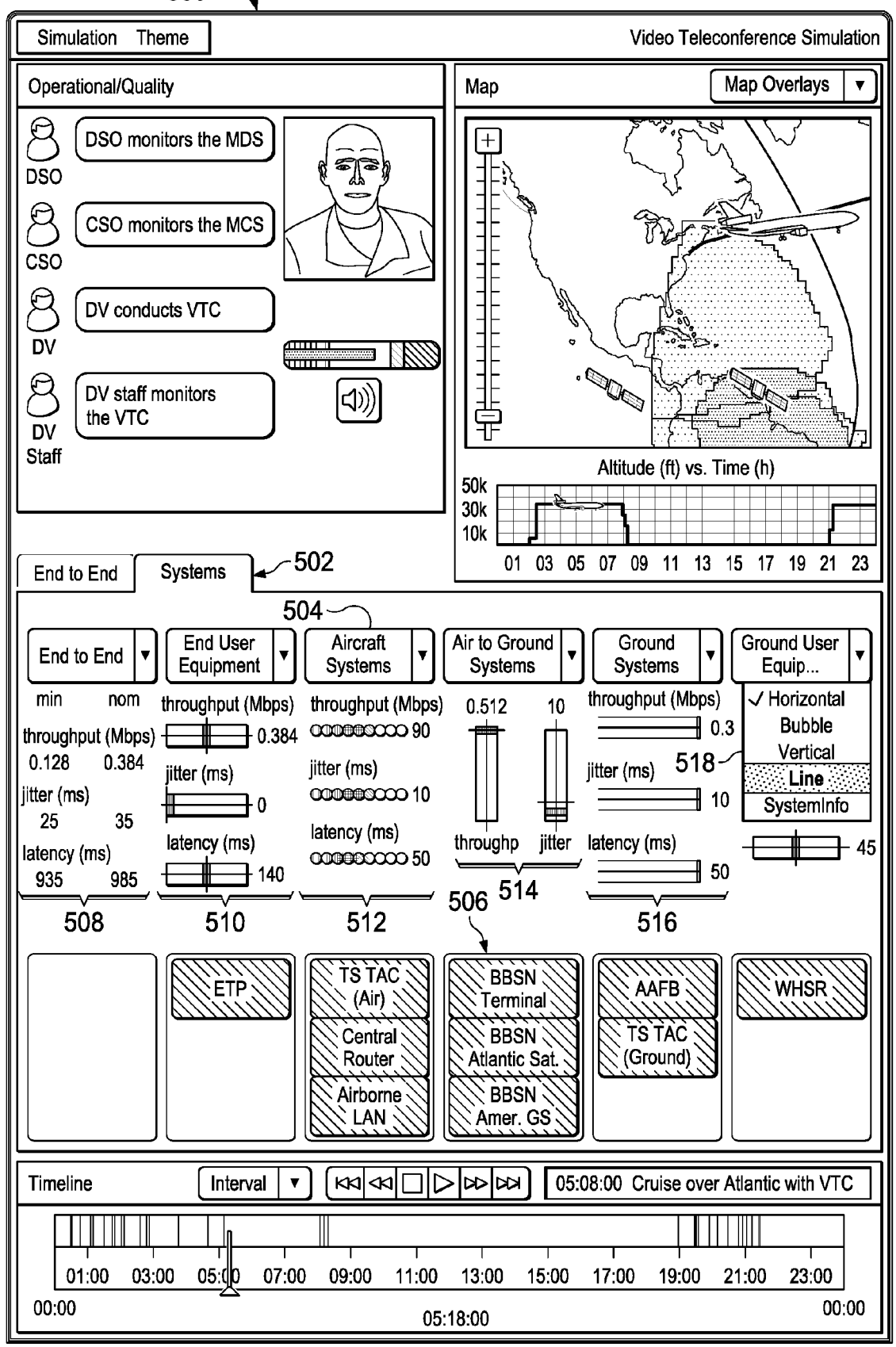
FIG. 5 is another example of a presentation for communications quality analysis in accordance with an advantageous embodiment.

Turning now to FIG. 5, another example of a presentation for communications quality analysis is depicted in accordance with an advantageous embodiment. In this example, presentation 500 of FIG. 5 is the same as presentation 400 of FIG. 4 except that a user has selected tab 502 to display a "Systems" view of the performance parameters. In this view, various performance parameters associated with the nodes of a communications link are presented below labels 504 identifying the nodes. Components associated with the nodes also may be identified in listing 506 of such components provided under the appropriate labels 504. In this example, the performance parameters associated with the nodes may be presented in a variety of user selectable formats. Examples of such formats include text 508, horizontal bar graphs 510, bubble graphs 512, vertical bar graphs 514, and line graphs 516. The desired format may be selected by a user independently for each node using pull-down menu 518 associated with each node label 504.

The illustrations of FIG. 4 and FIG. 5 are not meant to imply limitations to the manner in which different advantageous embodiments may be implemented. Presentations in accordance with advantageous embodiments may display information in different combinations and in different formats from those illustrated. Similarly, different user interface controls may be provided and/or such controls may be implemented in a different way from those illustrated for example herein.

Figure 6:
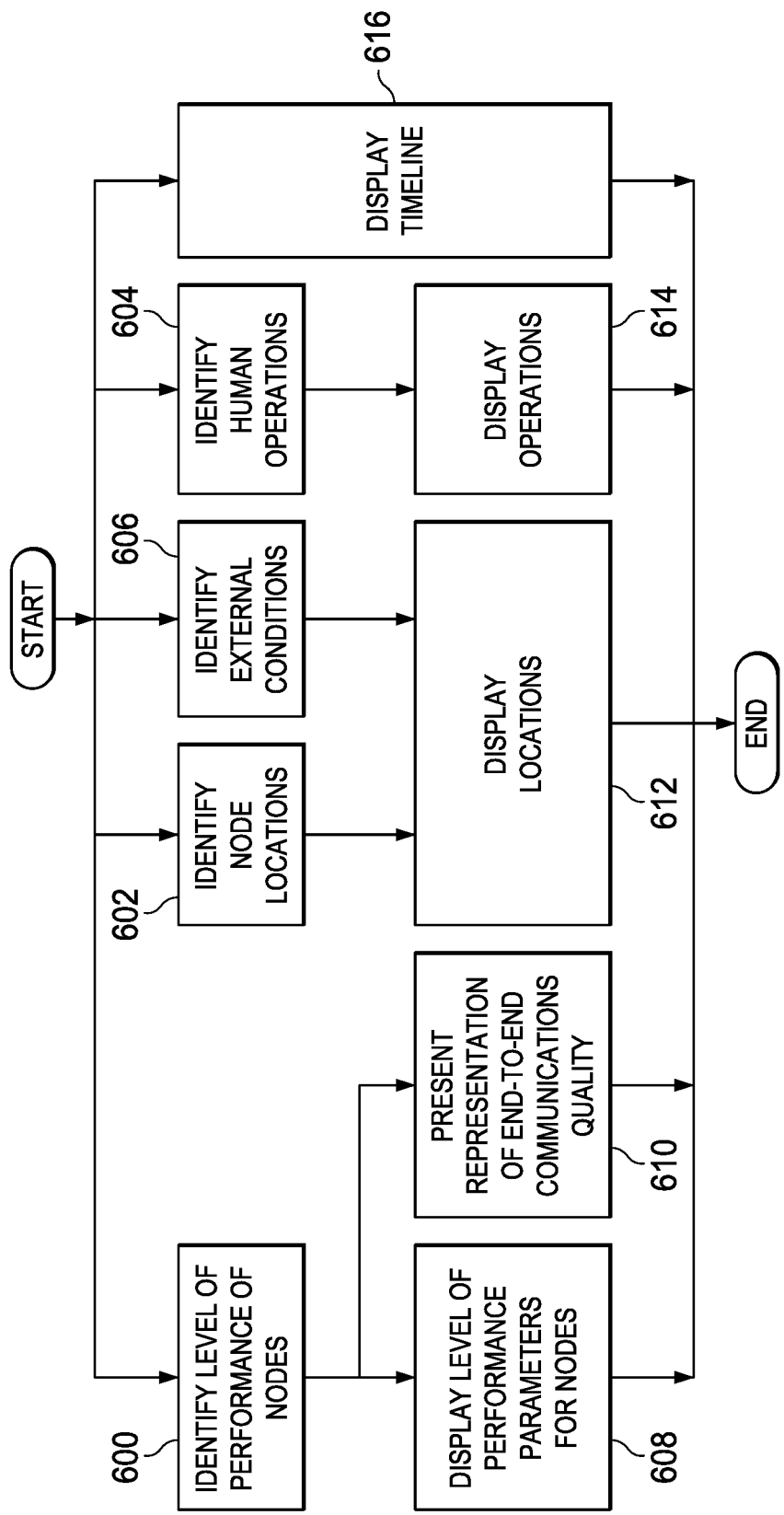
FIG. 6 is a flowchart of a process for communications quality analysis in accordance with an advantageous embodiment.

Turning now to FIG. 6, a flowchart of a process for communications quality analysis is depicted in accordance with an advantageous embodiment. The process illustrated in FIG. 6 may be implemented, for example, in quality analysis tool 200 of FIG. 2.

A process for analyzing a communications link in accordance with an advantageous embodiment begins with identifying parameters associated with a level of performance of a number of nodes (operation 600). For example, the number of nodes may comprise a number of end nodes and a number of intermediate nodes providing a communications link between the end nodes. Locations of selected ones of the nodes also may be identified (operation 602). Human operations related to operation of the communications link may be identified (operation 604). External conditions that may affect operation of the communications link may be identified (operation 606). Operation 606 may include identifying the locations of identified external conditions. Operations 600, 602, 604, and 606 may be performed simultaneously or sequentially in any order.

Level of performance parameters for the number of nodes may be displayed following operation 600 (operation 608). A representation of the end-to-end communications quality via the communications link also may be presented following operation 600 (operation 610). Operation 610 may include determining the quality of end-to-end communications via the communications link based on the level of performance parameters identified in operation 600. Operation 610 may include presenting a qualitative representation of end-to-end communications quality, presenting a quantitative representation of end-to-end communications quality, or both. Locations of selected ones of the nodes and locations of identified external conditions may be displayed following operations 602 and 606 (operation 612). For example, operation 612 may include displaying the locations of the selected ones of the nodes and the locations of the identified external conditions using appropriate indicators overlaid on a geographic map. Indications of operations performed by human operators may be presented following operation 604 (operation 614). A timeline also may be displayed (operation 616). In accordance with an advantageous embodiment, operations 608, 610, 612, 614, and 616 are performed simultaneously in a time synchronized manner.

Figure 7:
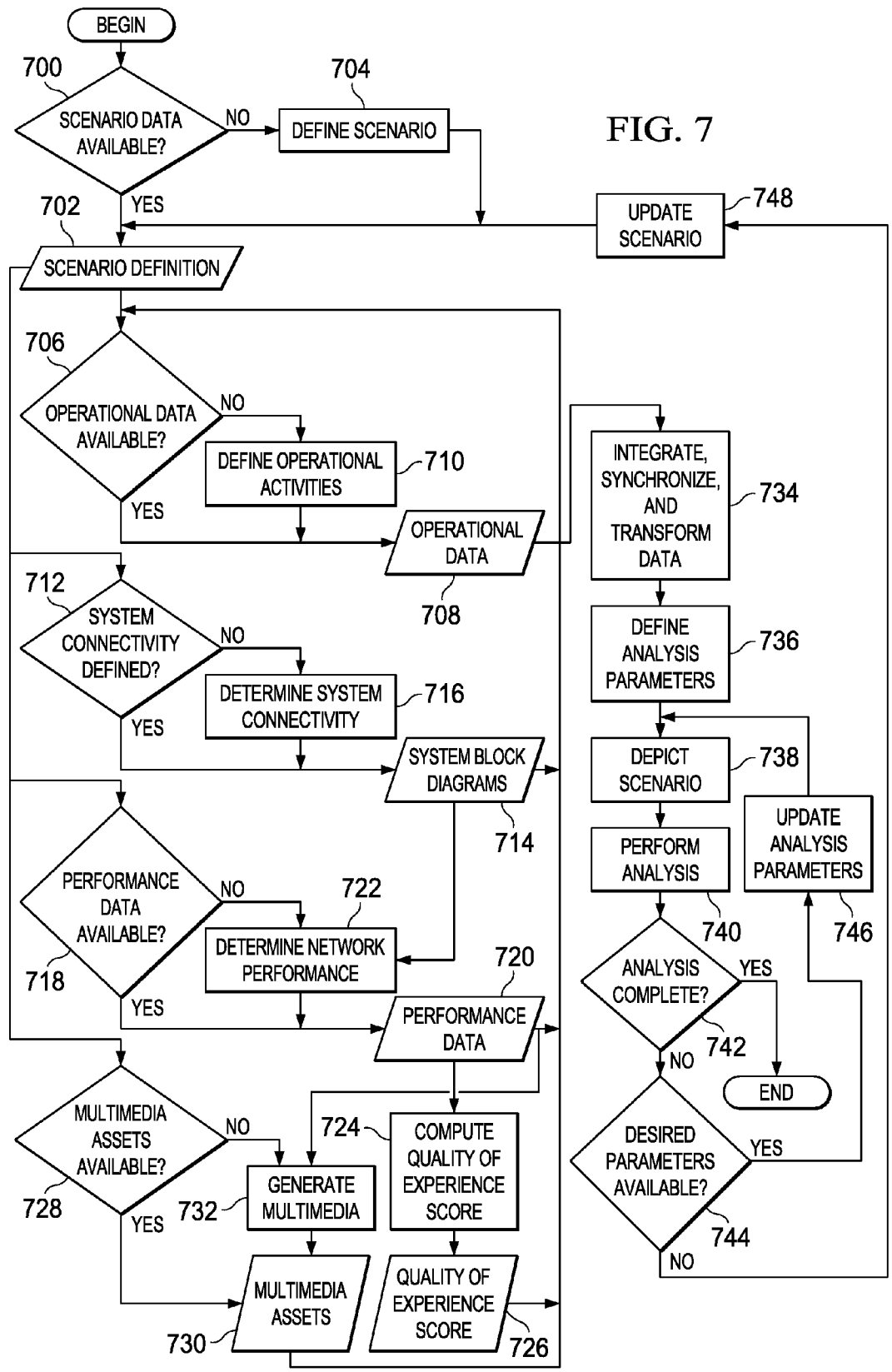
FIG. 7 is a more detailed flowchart of a process for communications quality analysis in accordance with an advantageous embodiment.

Turning now to FIG. 7, a more detailed flowchart of a process for communications quality analysis is depicted in accordance with an advantageous embodiment. The method of FIG. 7 may be implemented in quality analysis tool 200 illustrated in FIG. 2.

It is first determined whether scenario data defining a communications scenario to be analyzed is available (operation 700). The communications scenario may be based on available notional or real world data. If scenario data is available, the available scenario data forms scenario definition 702. If scenario data is not available, scenario definition 702 must be defined. Scenario definition 702 may be defined by defining scenario (operation 704). Operation 704 may comprise developing scenario definition 702 or receiving data to provide scenario definition 702. For example, operation 704 may comprise capturing data from a real-time data stream. Scenario definition 702 may comprise information such as geospatial location, time, narrative information, and external events, such as weather or other users affecting a communications link.

It may be determined whether operational data 708 for the scenario is available in scenario definition 702 (operation 706). Operational data 708 comprises data identifying operations performed by human operators. For example, operational data 708 may include data identifying interactions with systems or with other operators. If operational data 708 is not available in scenario definition 702, operational activities may be defined (operation 710) to obtain operational data 708.

It may be determined whether system connectivity is defined in scenario definition 702 (operation 712). For example, system connectivity may be defined by system block diagrams 714 of physical and/or logical connectivity, link properties, flow diagrams, and alternative configurations. If system block diagrams 714 are not defined in scenario definition 702, system connectivity may be determined (operation 716) to obtain system block diagrams 714.

It may be determined whether performance data is available in scenario definition 702 (operation 718). Performance data 720 may comprise captured or real-time performance information such as throughput, latency, and the like. Alternatively, or additionally, performance data 720 can comprise information such as configuration settings, coverage maps, or link budget models that can be used to derive performance information. If performance data 720 is not available in scenario definition 702 network performance can be determined (operation 722) to obtain performance data 720. For example, operation 722 may comprise generating performance data 720 if no captured or real-time data is available. Performance data 720 can be generated using built-in tools or by calling other tools, such a network models.

Once performance data 720 is available, subjective quality of experience score 726 is calculated (operation 724). Operation 724 may include relating objective measures, such as throughput or loss rate, to subjective user perceived qualities. Various methods, such as the algorithms provided by the ITU E-model may be used in operation 724 to generate quality of experience score 726.

It may be determined whether multimedia assets 730 are available (operation 728). Multimedia assets 730 may include video and/or audio devices or systems to convey an experience to a user. Multimedia assets 730 could be captured, real-time, or generated based on performance data 720. If no multimedia assets 730 are available, representative multimedia assets 730 may be generated (operation 732) or picked from existing assets based on performance data 720.

Scenario definition 702, operational data 708, system block diagrams 714, performance data 720, quality of experience score 726 and multimedia assets 730 are integrated, synchronized and transformed (operation 734). For example, operation 734 may comprise parsing system metrics, scenario activities, and geospatial data, converting into internal data models and correlating with the scenario timeline. System minimum, maximum, and nominal values are retrieved, and component graphic ranges are set. The timeline's activity periods may be displayed, and the geospatial view updated with scenario data.

After synchronization, the scenario is ready for analysis or viewing. At this point various analysis parameters may be defined (operation 736). For example, operation 736 may comprise tailoring various parameters, such as location, system, or time to focus on specific interest areas.

Once the parameters are set, the scenario is depicted (operation 738) and an analysis may be performed (operation 740) using the presented depiction. It may be determined whether the analysis is complete (operation 742). If it is determined at operation 742 that the analysis is complete, the process may be ended. If it is determined at operation 742 that the analysis is not complete, it is determined whether desired parameters to continue the analysis are available (operation 744). If it is determined at operation 744 that the desired parameters are available, analysis parameters may be updated (operation 746) and processing continues with depicting the scenario at operation 738 with the updated parameters. If it is determined at operation 744 that the desired parameters are not available, the scenario may be updated (operation 748) and the process may be restarted with the new scenario definition.

Figure 8:
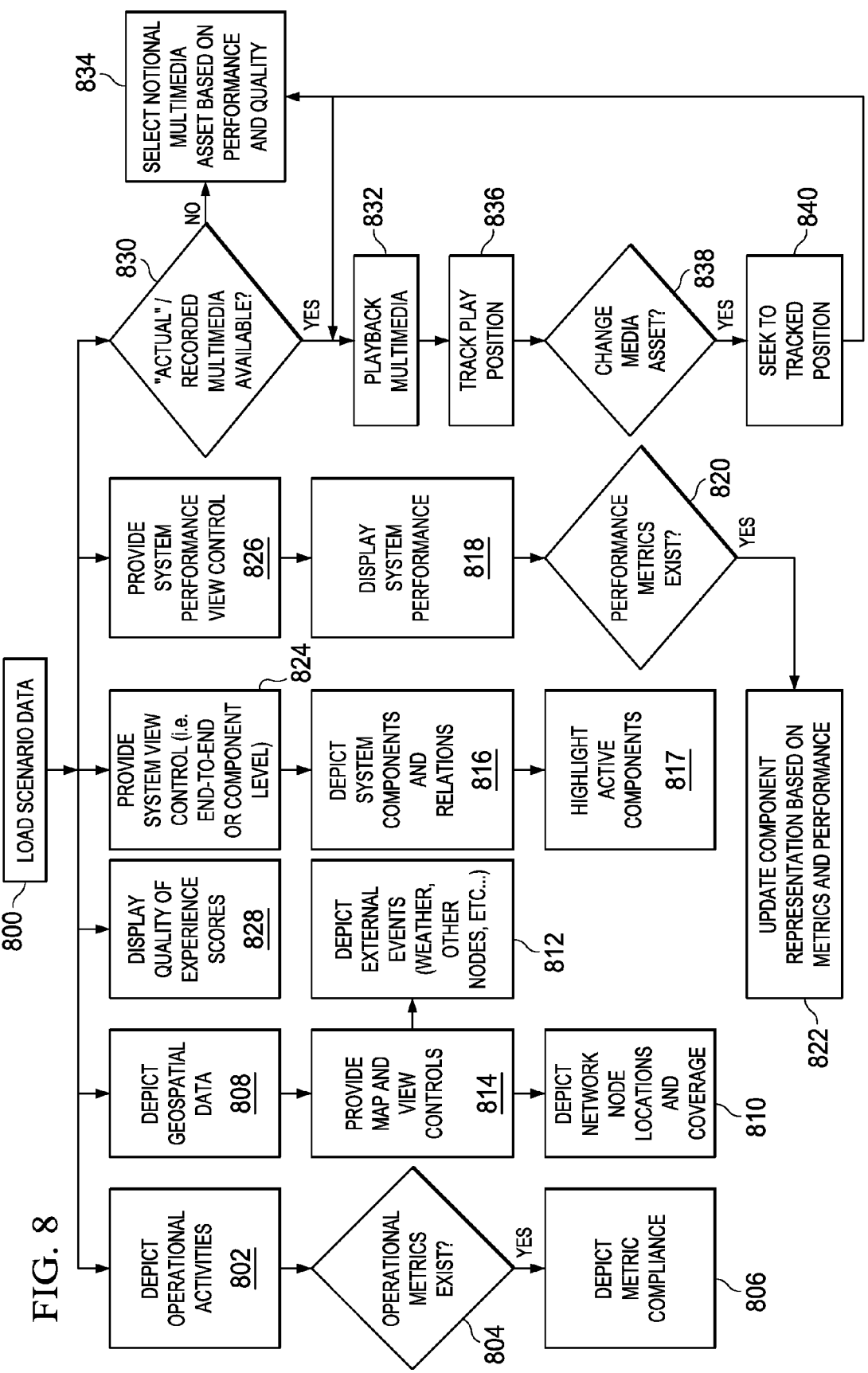
FIG. 8 is a flowchart of a process for generating a presentation for communications quality analysis in accordance with an advantageous embodiment.

Turning now to FIG. 8, a flowchart of a process for generating a presentation for communications quality analysis is depicted in accordance with an advantageous embodiment. The process of FIG. 8 is an example of one process for implementing operation 738 of the process shown in FIG. 7.

The process of presenting a depiction of a communications scenario may begin with loading the scenario data prepared by earlier operations (operation 800). Operation 800 also may include checking the loaded data.

Operational activities are depicted (operation 802). Operation 802 may include displaying operational activities through a combination of text and figures. It may be determined if certain operational metrics, such as activity loading exist (operation 804). If it is determined that operational metrics exist, operational metric compliance may be displayed (operation 806). For example, operation 806 may comprise highlighting any metric that is exceeded.

Geospatial data may be depicted (operation 808). For example, operation 808 may comprise presenting a geospatial display to depict node locations and spatial relations of network nodes to each other, coverage areas, and points of interest (operation 810). Spatial relations may be depicted in three dimensions if necessary to illustrate factors such as antenna pointing and blockages or attenuation due to weather. Weather or other external events or entities, such as other network nodes may be depicted if they impact the scenario (operation 812). Map and view controls may be provided (operation 814). For example, operation 814 may include providing view controls such as zoom and pan. The view may be set to automatically center on an item of interest if the item is moving.

System components and relations may be depicted (operation 816). For example, operation 816 may comprise displaying system relations to each other and connectivity between system blocks. Physical, logical, and/or flow relationships may be depicted. Active components may be highlighted (operation 817). Performance of the system and/or its components also may be depicted (operation 818). It may be determined whether performance metrics exist (operation 820). If performance metrics exist, the representation of the component may be updated based on the metrics and performance (operation 822). For example, operation 822 may include providing an indication of performance values relative to the metrics such as by highlighting or color coding or some other method. System view controls may be provided (operation 824) and system performance view controls may be provided (operation 826). Operations 824 and 826 allow a user to focus on areas of interest from end-to-end through specific components.

Quality of experience scores may be displayed (operation 828). Operation 828 may include providing a display showing the quality of experience score using a combination of text and figures. This display may be synchronized with the display of the system performance information.

It may be determined whether recorded multimedia is available (operation 830). If recorded multimedia is available, the recorded multimedia may be played back (operation 832) to provide a qualitative representation of the quality of experience scores. If recorded multimedia is not available, notional multimedia assets may be selected based on performance and quality (operation 834). The selected multimedia assets then may be played back at operation 832. Play position may be tracked (operation 836). It may be determined whether multimedia asset is changed (operation 838). If the multimedia asset is changed, the new asset will be played from the same position as was played in the original asset (operation 840).

One or more of the advantageous embodiments provides a method, system, and software embodied in a computer program product for analyzing communications services. Advantageous embodiments automatically integrate and synchronize the analysis across all of the nodes of a communications link to expedite the discovery of cross-node effects on the quality of communications via the link. For example, advantageous embodiments provide the ability to view simultaneously multiple factors for analyzing and managing end-to-end communications quality. Such factors may include the activities of human operators, communications system performance, and user perception of end-to-end communications quality. In addition to quantitative measurements, user perception of communications quality may be represented qualitatively with multimedia assets.

In accordance with an advantageous embodiment, views of technical information, such as system performance information, may be combined with views of human operational activities and views of the end user quality experience. This integration of views allows for integrated analysis of the many factors that may affect communications quality. For example, advantageous embodiments allow the effects of system performance and human operator actions on the end user experience to be readily seen. Advantageous embodiments also allow for the effects of system performance on human operator actions to be viewed and analyzed. For example, advantageous embodiments allow for the analysis of how system performance drives human operator actions in various scenarios, such as rerouting of a communications link when an established communications link fails.

Turning now to FIG. 9, an illustration of a data processing system is depicted in accordance with an advantageous embodiment. In this example, data processing system 900 is an example of data processing system 256 in FIG. 2 and of data processing system 360 in FIG. 3. In this advantageous example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another advantageous example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these advantageous examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the advantageous examples.

In some advantageous embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different advantageous embodiments may be implemented in a data processing system including components in addition to or in place of those illustrated for data processing system 900. Other components shown in FIG. 9 can be varied from the advantageous examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another advantageous example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted because the processes for the different embodiments are implemented in a hardware unit.

In still another advantageous example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications fabric 902.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
analyzing a quality of a communication link, wherein the quality of the communication link represents a level of communication performance between end point nodes of the communication link;

identifying parameters that affect the quality of the communication link, the parameters indicating a corresponding level of performance of a corresponding number of nodes at a point in time, the corresponding number of nodes comprising end nodes and a number of intermediate nodes providing a communications link between the end nodes, wherein identified parameters are formed;

identifying locations of selected ones of the corresponding number of nodes at the point in time;

integrating and synchronizing an analysis of the identified parameters across all of the corresponding number of nodes; and displaying simultaneously all of: a representation of the quality of the communication link and the parameters for the point in time, the locations at the point in time, the analysis, and a representation of end-to-end quality of communications between the end nodes via the communications link at the point in time based on the parameters, wherein the analysis includes integrated and synchronized identified parameters, and the displaying of the analysis expedites discovery of cross-node effects on a quality of communications via the communications link.

2. The method of claim 1 further comprising:

displaying a timeline simultaneously with displaying the parameters, the locations, and the representation of end-to-end quality of communications between the end nodes; and displaying an indicator on the timeline, wherein a position of the indicator on the timeline indicates the point in time.

3. The method of claim 1, wherein the communications link provides video communications between the end nodes and wherein the representation of end-to-end quality of communications between the end nodes comprises a video, wherein a quality of the video indicates the end-to-end quality of communications between the end nodes.

4. The method of claim 1, wherein the communications link provides audio communications between the end nodes and wherein the representation of end-to-end quality of communications between the end nodes comprises audio, wherein a quality of the audio indicates the end-to-end quality of communications between the end nodes.

5. The method of claim 1, wherein displaying the locations comprises displaying the locations as indicators overlaid on a geographic map.

6. The method of claim 1, wherein one of the end nodes is located on an aircraft in flight.

7. The method of claim 1, wherein:

identifying parameters further comprises identifying an external factor that affect the quality of the communications link, the external factor selected from the group consisting of: weather and natural or man-made environmental conditions; and displaying further comprises also simultaneously displaying the external factor.

8. An apparatus comprising:

a display system; and a processor unit configured to analyze a quality of a communication link, wherein the quality of the communication link represents a level of communication performance between end point nodes of the communication link;

the processor unit configured to identify parameters that affect the quality of the communication link, the parameters indicating a corresponding level of performance of a corresponding number of nodes at a point in time, the corresponding number of nodes comprising end nodes and a number of intermediate nodes providing a communications link between the end nodes, wherein upon identifying the parameters identified parameters are formed;

the processor unit further configured to identify locations of selected ones of the corresponding number of nodes at the point in time;

the processor unit further configured to integrate and synchronize an analysis of the identified parameters across all of the corresponding number of nodes; and the processor unit further configured to command to the display system to display simultaneously on the display system all of: a representation of the quality of the communication link and the parameters for the point in time, the locations at the point in time, and a representation of end-to-end quality of communications between the end nodes via the communications link at the point in time based on the parameters, wherein the analysis includes integrated and synchronized identified parameters and the displaying of the analysis expedites discovery of cross-node effects on a quality of communications via the communications link.

9. The apparatus of claim 8, wherein the processor unit is further configured to:

display, on the display system, a timeline simultaneously with the displayed parameters, the locations, and the representation of end-to-end quality of communications between the end nodes; and display an indicator on the timeline, wherein a position of the indicator on the timeline indicates the point in time.

10. The apparatus of claim 8, wherein the communications link provides video communications between the end nodes and wherein the representation of end-to-end quality of communications between the end nodes comprises a video, wherein a quality of the video indicates the end-to-end quality of communications between the end nodes.

11. The apparatus of claim 8 further comprising:

a speaker; and wherein the communications link provides audio communications between the end nodes and wherein the processor unit is further configured to present audio on the speaker, wherein a quality of the audio indicates the end-to-end quality of communications between the end nodes based on the parameters.

12. The apparatus of claim 8, wherein the locations are displayed as indicators overlaid on a geographic map.

13. The apparatus of claim 8, wherein one of the end nodes is located on an aircraft in flight.

14. The apparatus of claim 8, wherein:

the processor unit, in being configured to identify parameters, is further configured to identify an external factor that affect the quality of the communications link, the external factor selected from the group consisting of: weather and natural or man-made environmental conditions; and the processor unit, in being configured to display also is further figured to simultaneously display the external factor.

15. A non-transitory computer readable storage medium storing program instructions, which when executed by a processor, transform a data processing system by performing a computer-implemented method, the program instructions comprising:

first program instructions configured to analyze a quality of a communication link, wherein the quality of the communication link represents a level of communication performance between end point nodes of the communication link;

second program instructions to identify parameters that affect the quality of the communication link, the parameters associated with a corresponding level of performance of a corresponding number of nodes at a point in time, the corresponding number of nodes comprising end nodes and a number of intermediate nodes providing a communications link between the end nodes;

third program instructions to identify locations of selected ones of the corresponding number of nodes at the point in time;

fourth program instructions to integrate and synchronize an analysis of the identified parameters across all of the corresponding number of nodes; and fifth program instructions to display simultaneously all of: a representation of the quality of the communication link and the parameters for the point in time, the locations at the point in time, the analysis, and a representation of end-to-end quality of communications between the end nodes via the communications link at the point in time based on the parameters, wherein the analysis includes integrated and synchronized identified parameters and the displaying of the analysis expedites discovery of cross-node effects on a quality of communications via the communications link.

16. The non-transitory computer readable storage medium of claim 15, wherein the program instructions further comprise:

sixth program instructions to display a timeline simultaneously with the display of the parameters, the locations, and the representation of end-to-end quality of communications between the end nodes; and seventh program instructions to display an indicator on the timeline, wherein a position of the indicator on the timeline indicates the point in time.

17. The non-transitory computer readable storage medium of claim 15, wherein the communications link provides video communications between the end nodes and wherein the representation of end-to-end quality of communications between the end nodes comprises a video, wherein a quality of the video indicates the end-to-end quality of communications between the end nodes.

18. The non-transitory computer readable storage medium of claim 15, wherein the communications link provides audio communications between the end nodes and wherein the program instructions further comprise:

sixth program instructions to present audio, wherein a quality of the audio indicates the end-to-end quality of communications between the end nodes.

19. The non-transitory computer readable storage medium of claim 15, wherein one of the end nodes is located on an aircraft in flight.

20. The method of claim 15, wherein:

the second program instructions identifying parameters further comprises instructions for identifying an external factor that affect the quality of the communications link, the external factor selected from the group consisting of: weather and natural or man-made environmental conditions; and fifth program instructions for displaying further comprises instructions for also simultaneously displaying the external factor.

* * * * *